United States Patent
Abedin et al.

(12) 
(10) Patent No.: US 9,077,148 B2
(45) Date of Patent: Jul. 7, 2015

(54) GAIN-EQUALIZED FEW-MODE FIBER AMPLIFIER

(71) Applicant: OFS Fitel, LLC, Norcross, GA (US)

(72) Inventors: Kazi S. Abedin, Basking Ridge, NJ (US); Man F. Yan, Berkeley Heights, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/486,616

(22) Filed: Sep. 15, 2014

(65) Prior Publication Data

US 2015/0077837 A1   Mar. 19, 2015

Related U.S. Application Data

(60) Provisional application No. 61/879,329, filed on Sep. 18, 2013.

(51) Int. Cl.
| | |
|---|---|
| *H01S 3/00* | (2006.01) |
| *H01S 3/16* | (2006.01) |
| *H01S 3/067* | (2006.01) |
| *H01S 3/094* | (2006.01) |

(52) U.S. Cl.
CPC ........... *H01S 3/1698* (2013.01); *H01S 3/06716* (2013.01); *H01S 3/06729* (2013.01); *H01S 3/06733* (2013.01); *H01S 3/06737* (2013.01); *H01S 3/06754* (2013.01); *H01S 3/094007* (2013.01); *H01S 3/1608* (2013.01)

(58) Field of Classification Search
CPC ............ H01S 3/06716; H01S 3/06729; H01S 3/06733; H01S 3/06737; H01S 3/06754; H01S 3/094007
USPC ........................................................ 359/337
See application file for complete search history.

(56) References Cited

U.S. PATENT DOCUMENTS

| | | | | |
|---|---|---|---|---|
| 5,187,759 | A | * | 2/1993 | DiGiovanni et al. ........... 385/27 |
| 5,742,722 | A | * | 4/1998 | Imoto ............................ 385/126 |
| 8,848,285 | B2 | * | 9/2014 | Bennett et al. ............. 359/341.5 |
| 2014/0036348 | A1 | * | 2/2014 | Bennett et al. ............. 359/341.3 |
| 2014/0063594 | A1 | * | 3/2014 | Herstrom et al. .......... 359/341.5 |
| 2014/0153883 | A1 | * | 6/2014 | Mukasa ....................... 385/100 |

* cited by examiner

*Primary Examiner* — Mark Hellner
(74) *Attorney, Agent, or Firm* — Jacobs & Kim LLP

(57) ABSTRACT

A few-mode rare-earth-doped amplifier fiber has equalized gain for the supported signal transmission modes. The fiber has a raised-index core surrounded by a lower-index cladding region. The core has a radius $a_1$ and an index difference $\Delta n_1$ relative to the surrounding cladding region and is configured to support, at a selected signal wavelength, a set of lower-order fiber modes having an optical field with a diameter greater than $2 \cdot a_1$. The fiber further includes an active region, doped with a rare-earth dopant, comprising an inner portion that is coextensive with the core and an outer portion that surrounds the inner portion and extends into the cladding. The active region has an outer radius $a_2$ greater than $a_1$ that encompasses the optical field of the set of lower-order fiber modes at the selected signal wavelength.

15 Claims, 18 Drawing Sheets

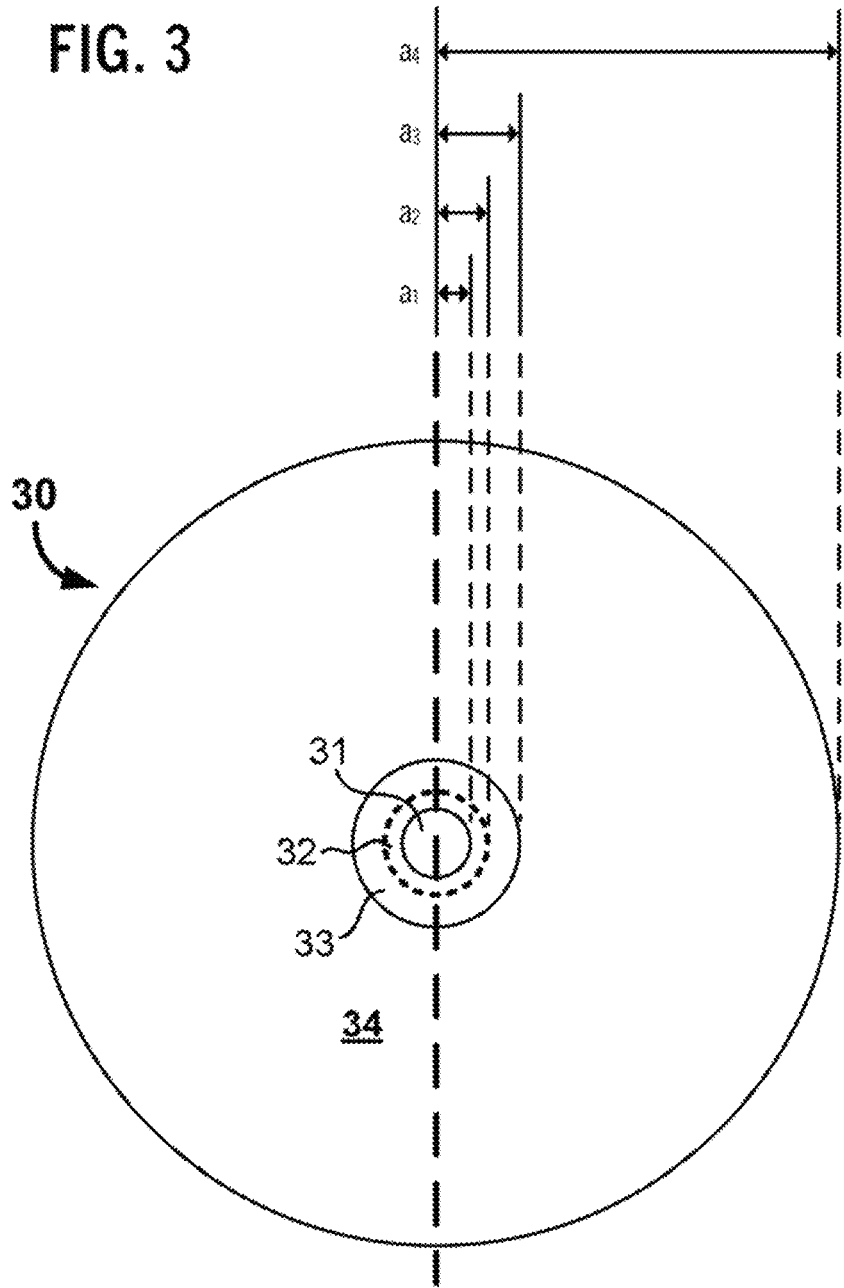

| | Radius | Index Difference (Δn) |
|---|---|---|
| Core | $a_1 = 8$ μm | $\Delta n_1 = 0.0081$ (NA=0.154)<br>$\Delta n_1 + \Delta n_2 = 0.0181$ (NA=0.230) |
| Active Region<br>(Er @ $6.9 \times 10^{24}/m^3$) — Inner Portion | (same as core) | (same as core) |
| Active Region<br>(Er @ $6.9 \times 10^{24}/m^3$) — Outer Portion<br>(co-doped with F) | $a_2 = 16$ μm<br>($a_2 \geq w_0 > a_1$) | (same as inner cladding) |
| Inner Cladding | $a_3 = 40$ μm<br>($a_3 \geq 16$ μm) | $\Delta n_2 = 0.01$ (NA=0.171) |
| Outer Cladding | $a_4 = 62.5$ μm | $\Delta n_3 = 0$ |

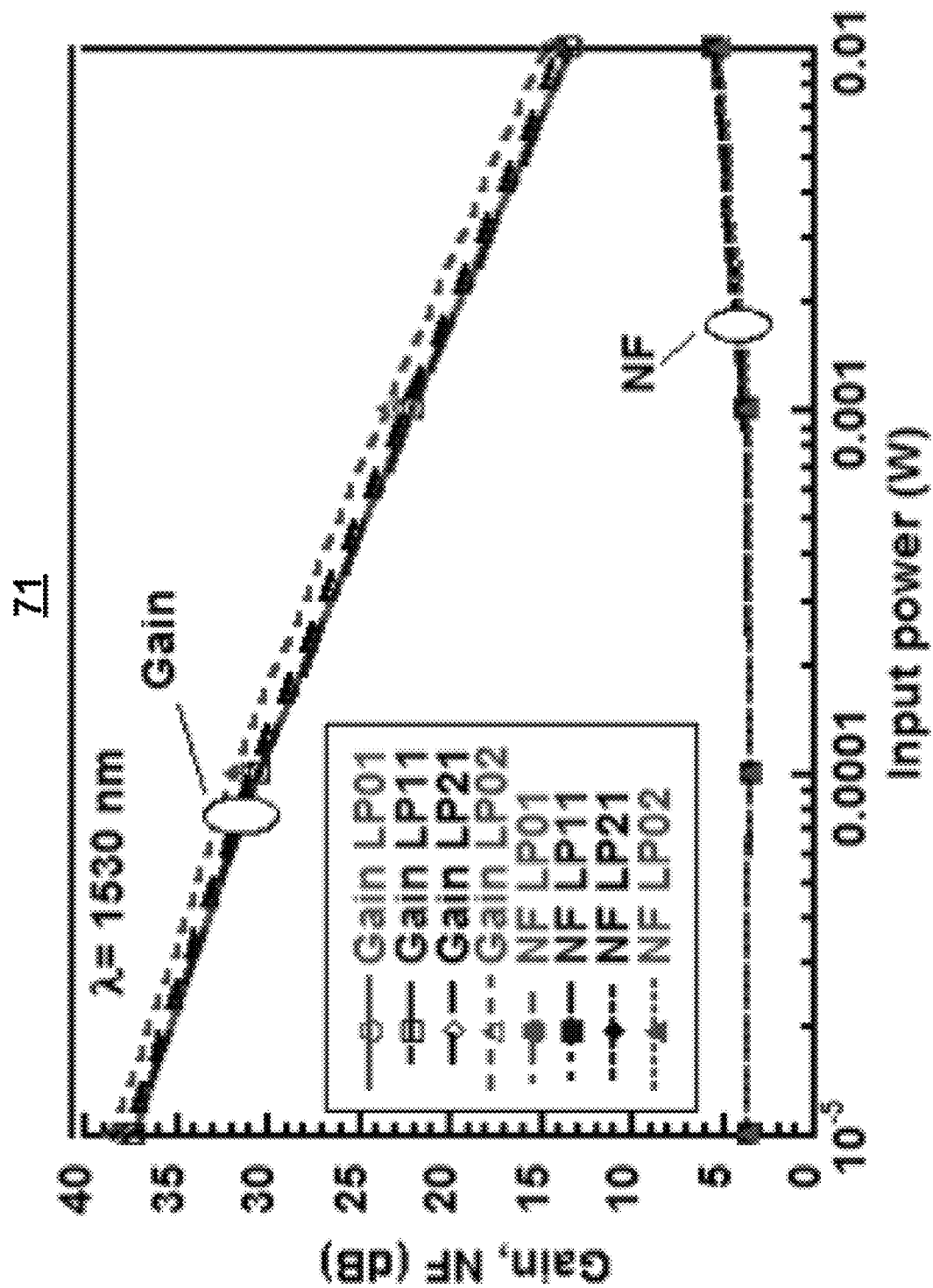

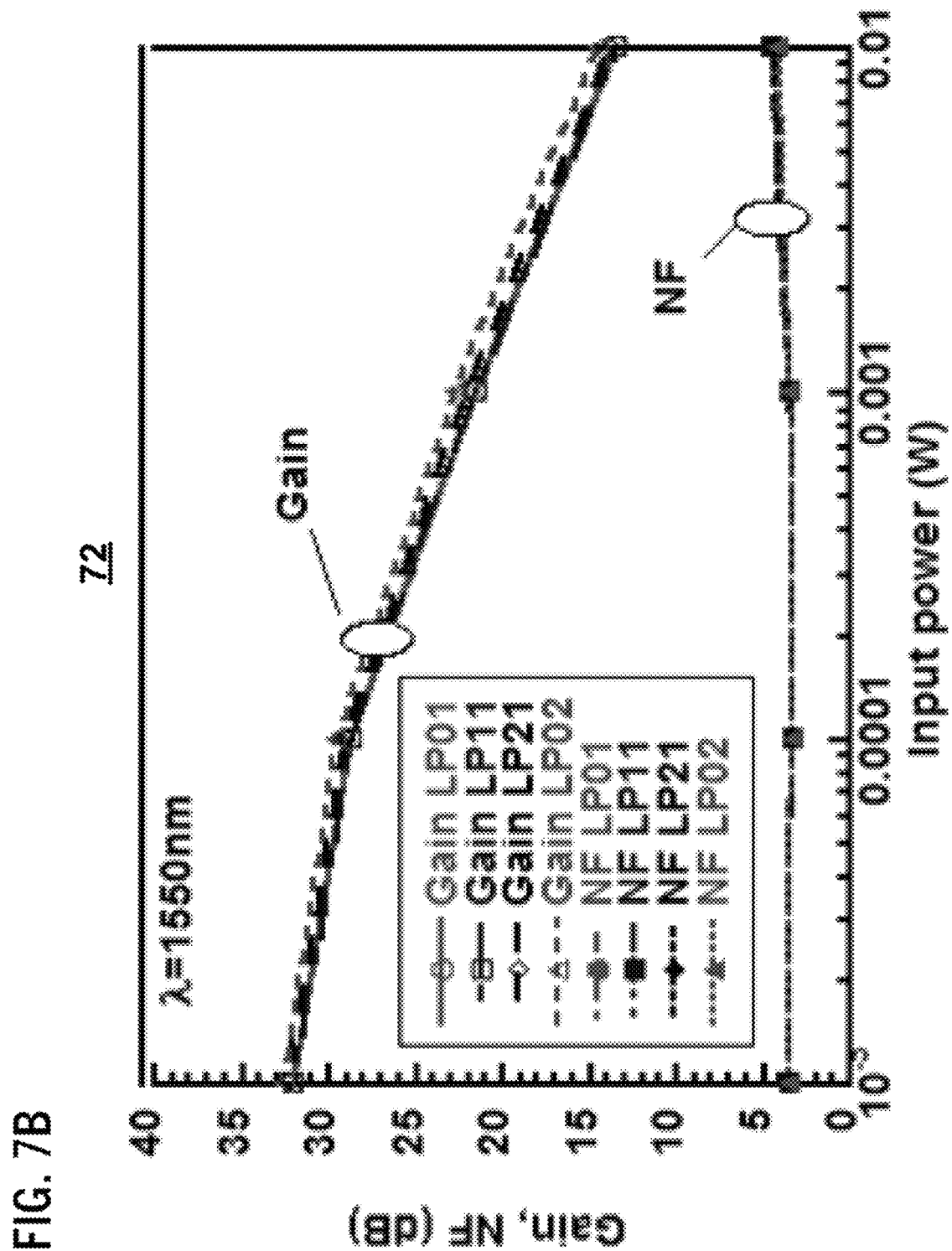

GAIN-EQUALIZED FEW-MODE FIBER AMPLIFIER

CROSS REFERENCE TO RELATED APPLICATIONS

The present application claims the priority benefit of U.S. Provisional Patent Application No. 61/879,329, filed on Sep. 18, 2013, which is owned by the assignee of the present application.

BACKGROUND OF THE INVENTION

1. Field of the Invention

The present invention relates generally to the field of fiber optical communications, and in particular to optical fiber amplifiers and amplification techniques.

2. Background Art

Few-mode rare-earth-doped fiber amplifiers provide gain to the fundamental ($LP_{01}$) mode and a relatively small number of higher-order $LP_{m,n}$ modes, and are critical components in space-division-multiplexed optical transmission systems based on few-mode transmission fibers. Such systems have the potential of greatly enhancing transmission capacity and thus have recently attracted a great deal of interest.

A prior-art fiber amplifier for use in single-mode transmission typically has a step refractive-index profile, comprising a core for guiding a fundamental mode ($LP_{01}$) optical signal. A prior-art amplifier fiber further includes a rare-earth-doped region having a radius that is the same or slightly smaller than the core radius. A suitable pump source is used to provide pump radiation to the rare-earth-doped region.

Transmission of light signals at higher-order modes requires a core that is larger than that of a single-mode fiber amplifier. However, an increase in core size results in significant gain differences among the supported transmission modes. Gain equalization is thus a significant issue to be addressed in the development of few-mode optical fiber amplifiers. In addressing this issue, a few-mode optical fiber amplifier design should also take into consideration the overall complexity and cost of the design.

SUMMARY OF INVENTION

A first practice of the invention provides a few-mode rare-earth-doped amplifier fiber with equalized gain. The fiber has a raised-index core surrounded by a lower-index cladding. The core has a radius $a_1$ and an index difference $\Delta n_1$ relative to the surrounding cladding and is configured to support, at a selected signal wavelength, a set of lower-order fiber modes having an optical field with a diameter greater than $2 \cdot a_1$. The fiber further includes an active region, doped with a rare-earth dopant, comprising an inner portion that is coextensive with the core and an outer portion that surrounds the inner portion and extends into the cladding. The active region has an outer radius $a_2$ greater than $a_1$ that encompasses the optical field of the set of lower-order fiber modes at the selected signal wavelength.

In a further practice of the invention, the few-mode rare-earth-doped amplifier fiber is provided with an inner few-mode waveguide for transmitting signals in a number of selected modes, and a multimoded outer waveguide for guiding pump light from a suitable pump source.

BRIEF DESCRIPTION OF THE DRAWINGS

FIG. 3 shows a cross section diagram of an exemplary few-mode amplifier fiber according to an aspect of the invention.

FIG. 5 shows a table setting forth specific values for an exemplary implementation of the few-mode fiber amplifier shown in FIG. 4.

FIGS. 6A-6C, 7A-7C, 8A-8B, and 9 show a series of graphs illustrating the calculated modal gain for an exemplary few-mode fiber amplifier incorporating the values set forth in the table shown in FIG. 5.

DETAILED DESCRIPTION

Figure 1:
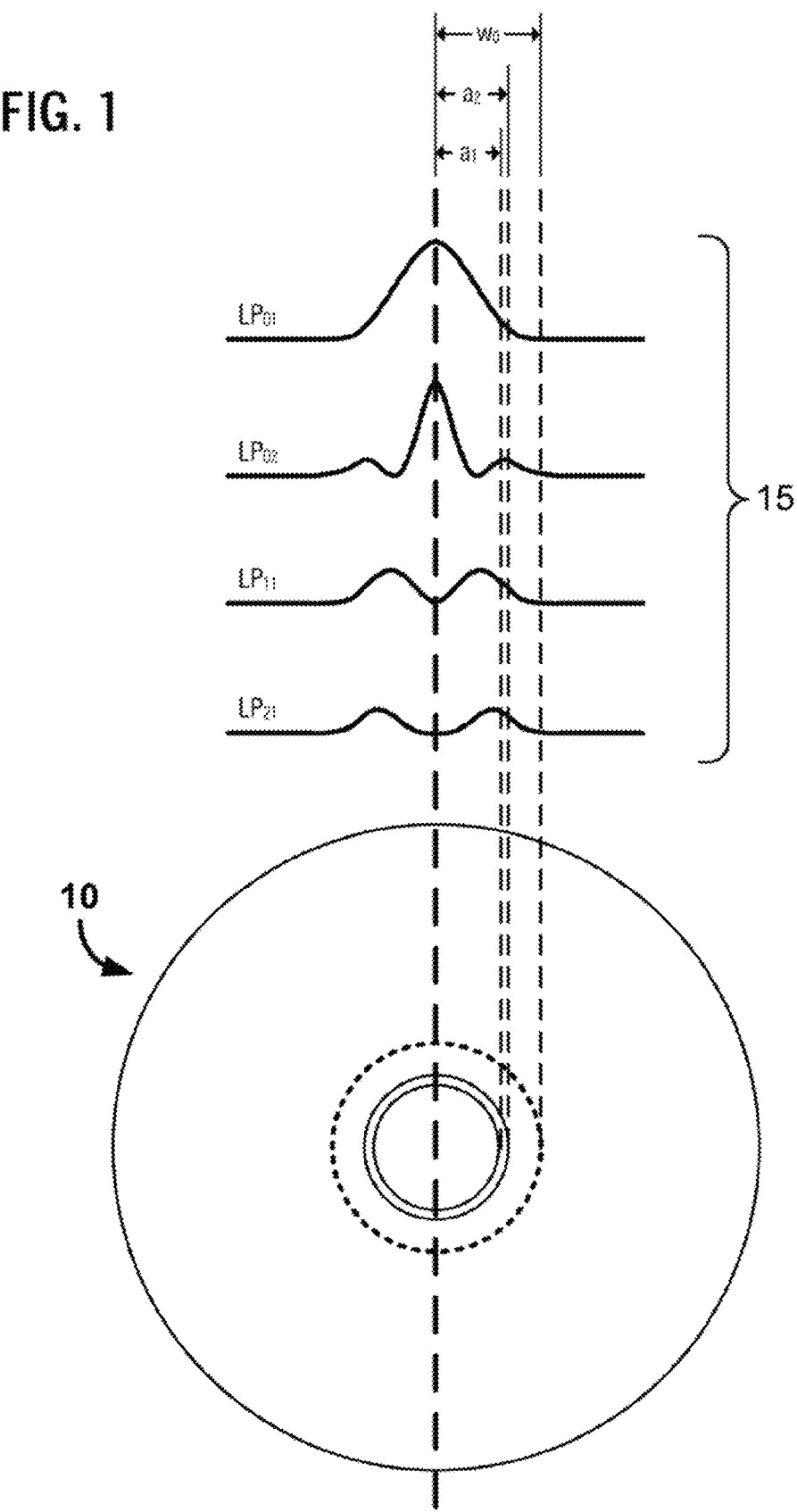
FIG. 1 shows a cross-section diagram of an exemplary few-mode amplifier fiber.

Aspects of the recent invention are directed to a few-mode fiber amplifier and amplification techniques that are inherently capable of providing equal gain to all the modes supported by the core, and that allow operation over a wide range of pump powers.

One practice of the invention is directed to a few-mode, rare-earth-doped fiber having (a) a core that supports, at a selected signal wavelength (or a selected range of signal wavelengths), the fundamental $LP_{01}$ mode and a selected set of higher-order $LP_{m,n}$ modes; and (b) a rare-earth-doped active region that is large enough to encompass the optical field of the supported modes.

As discussed below, in a few-mode amplifier fiber, unequal portions of the respective optical fields of the supported modes extend beyond core radius. In a few-mode amplifier fiber in which the active region is the same size as the core, the modal gains are not equal because of the inequality of the overlap integrals $\Gamma$ between the active region and the respective intensity profiles of the supported modes.

According to an aspect of the invention, modal gains are equalized in a few-mode rare-earth-doped amplifier fiber by chemically doping the fiber to provide a rare-earth-doped region that is large enough to encompass the optical fields of all of the selected higher-order modes, while at the same time maintaining a core radius that supports transmission in the selected modes. As discussed below, the rare-earth-doped active region encompassing the entire core and an outer portion that surrounds, and extends beyond, the core. Suitable rare-earth dopants for the active region include, for example: erbium (Er), ytterbium (Yb), neodymium (Nd), thulium (Tm), and the like, by themselves, in combination with each other, or in combination with other suitable dopants.

In a further practice of the invention, the above-described few-mode, rare-earth-doped fiber is configured to include a pump light waveguide having a radial extent that encompasses at least the rare-earth-doped active region. According to an aspect of the invention, the pump light is multimoded, and is configured to provide uniform population inversion across the active region so as to equalize gain for different signal transmission modes.

There is now discussed the theoretical foundation of the invention, followed by a description of a number of exemplary practices.

Theoretical Foundation

The small-signal gain, g, per unit length of a gain medium is the gain obtained for an input signal that is small enough to prevent gain saturation. For a conventional erbium-doped fiber having an active region that is uniformly doped with erbium, wherein the active region has a radius R that is less than the fiber radius, the small-signal gain, g, can be expressed by the following Equation (1):

$$g = (N_2 \sigma_s^e - N_1 \sigma_s^a) \Gamma \qquad \text{Eq. (1)}$$

where:
$N_1$=population of the lower state of the laser/amplifier transition;
$N_2$=population of the upper state of the laser/amplifier transition;
$\sigma_s^e$=emission cross section at the signal wavelength;
$\sigma_s^a$=absorption cross section at the signal wavelength; and
$\Gamma$=overlap factor.

The overlap factor $\Gamma$ (also known as the "overlap integral" or "overlap integral factor"), accounts for the proportion of the optical signal power propagating through the rare-earth-doped region, and can be expressed by the following Equation (2):

$$\Gamma = \int_0^R \int_0^{2\pi} I_n(r, \theta) r\, d\varphi\, dr \qquad \text{Eq. (2)}$$

where:
$I_n(r, \theta)$=normalized transverse mode intensity profile of the signal; and
R=radius of the equivalent flat top distribution of the rare-earth-doped region.

In a rare-earth-doped fiber having a core that supports a selected few higher-order $LP_{m,n}$ modes, the overlap integral $\Gamma$ is different for the different modes. This difference in $\Gamma$ in turn results in modal gain differences that vary as a function of the core radius and the radius of the active region.

Equations (1) and (2) are now discussed with respect to an exemplary few-mode rare-earth-doped fiber.

FIG. 1 shows a cross-section diagram of the exemplary fiber 10, which comprises a few-mode core 11 with radius $a_1$, a rare-earth-doped active region 12 with radius $a_2$, and a cladding region 14. Core 11 is configured to support four transmission modes: the fundamental mode $LP_{01}$ and the higher-order $LP_{11}$, $LP_{21}$, and $LP_{02}$ modes. For the purposes of illustration, a set of graphs 15 of the respective intensity distributions of the four modes are shown at the top of FIG. 1 in alignment with the cross section of fiber 10.

As shown in FIG. 1, the optical field 16 of the four modes has an outer radius $w_0$ that is larger than the core radius $a_1$. (It is noted that, unless indicated otherwise either explicitly or by context, the term "optical field" refers generally to the optical fields of the supported modes of a few-mode fiber.) As noted above, the four depicted modes have varying portions extending outside of the core.

For the purposes of the present discussion, the active region radius $a_2$ is treated as a variable, and the core radius $a_1$ and the optical field radius $w_0$ are constants for a given fiber design at the wavelength of interest. From Equations (1) and (2), discussed above, it will be seen that the respective overlap integrals for each of the supported modes varies as a function of the radius $a_2$ of rare-earth doped region 12.

Figure 2A:
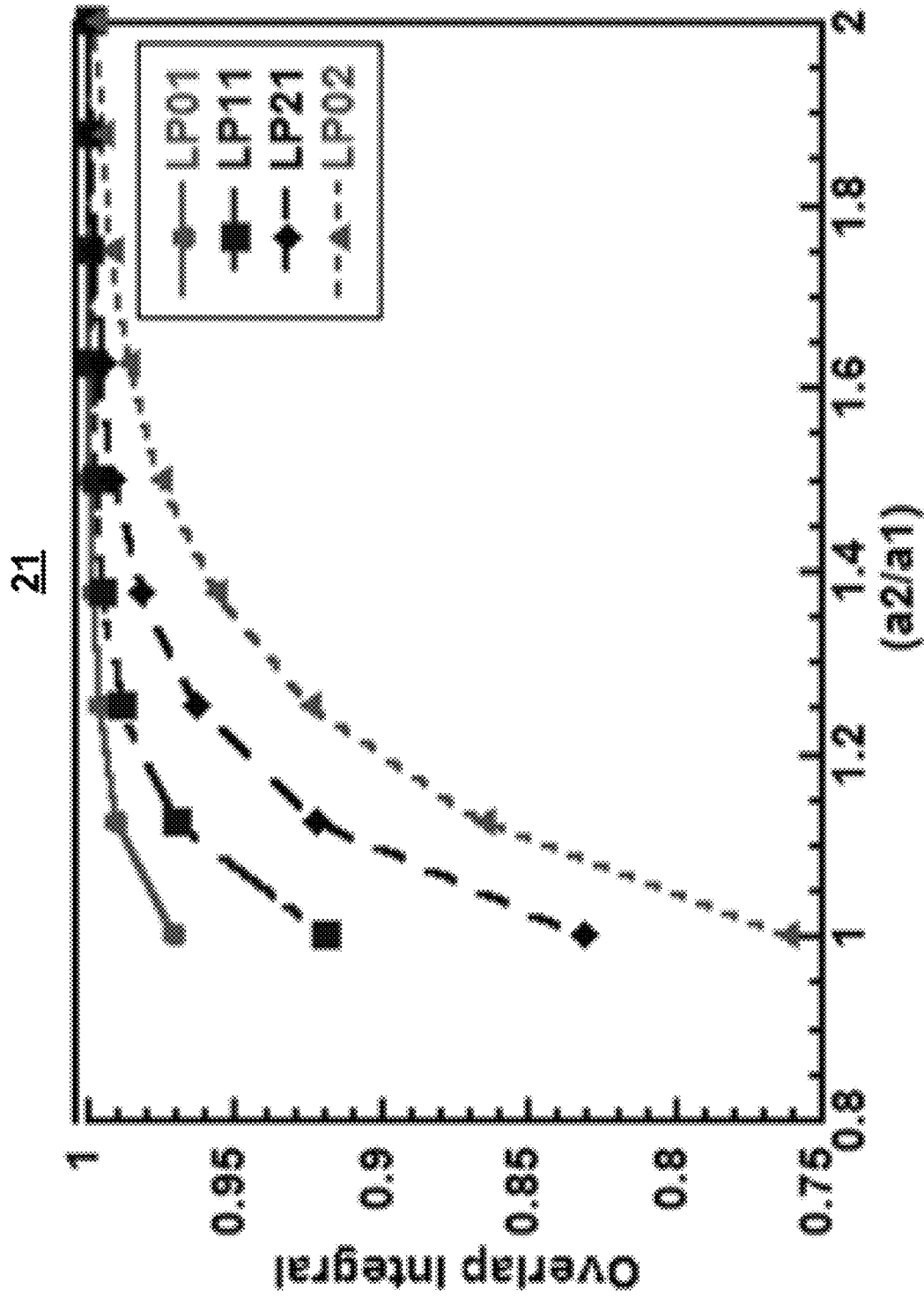
FIG. 2A shows a graph in which the overlap integrals for the modes supported by the fiber shown FIG. 1 are plotted as a function of the radius of the active region normalized to the core radius.

FIG. 2A shows a graph 21 in which the overlap integrals for the fundamental mode $LP_{01}$ and three higher-order modes $LP_{11}$, $LP_{21}$, and $LP_{02}$ are plotted as a function of $a_2/a_1$ (i.e., the active region radius $a_2$ normalized to the core radius $a_1$). The values for $a_2/a_1$ range from 1.0 (i.e., $a_2=a_1$) to 2.0 (i.e., $a_2=2 \cdot a_1$). The V-number, defined as $2\pi a_1(NA)/\lambda$, is assumed to be 5.0 at the signal wavelength, supporting the four selected modes.

Graph 21 shows that when the doped region and the core region are of the same size ($a_2/a_1=1$), the higher-order modes (i.e., the $LP_{11}$, $LP_{21}$, and $LP_{02}$ modes) exhibit a much smaller overlap integral in comparison with the fundamental mode $LP_{01}$. Graph 21 further shows that as the radius of the rare-earth-doped region $a_2$ increases relative to the core radius $a_1$, the difference between the respective overlap integrals decreases.

Figure 2B:
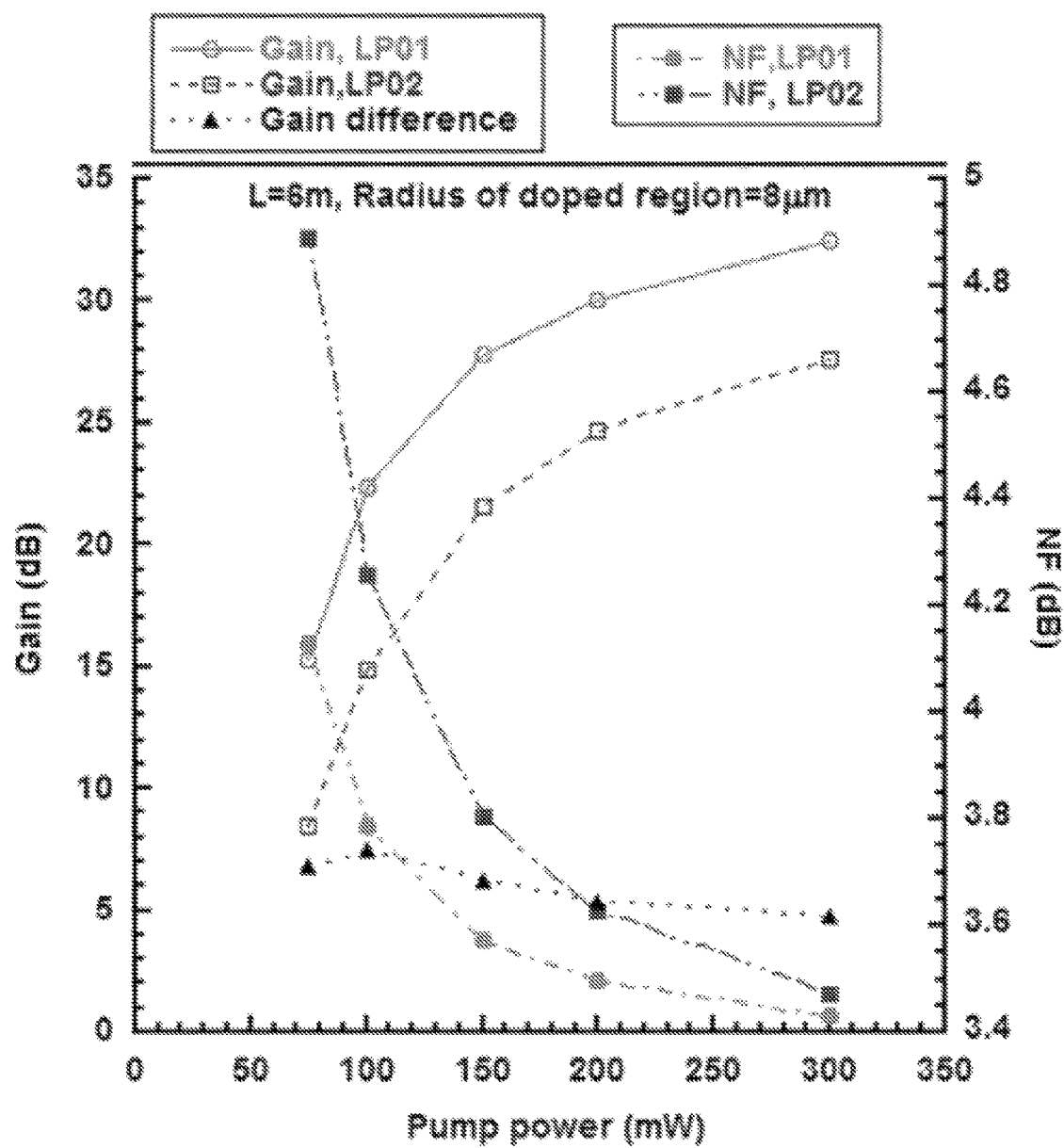
FIG. 2B shows a graph in which the small-signal gain, gain difference, and noise figure for the supported modes are plotted as a function of pump power.

Pump power is another factor to be considered. FIG. 2B shows a graph 22 in which the small-signal gain, gain difference, and noise figure (NF) for the $LP_{01}$ and $LP_{02}$ modes, measured in decibels (dB), are plotted as a function of pump power, measured in milliwatts (mW). The core is assumed to have a diameter of 16 μm and a V-number of 5.0. The length of the gain fiber is 6 m and doping concentration of erbium is assumed to be $6.9 \times 10^{24}/m^3$. A Gaussian pump at 980 nm is assumed.

As illustrated in graph 22, the gain in the $LP_{02}$-moded signal can be lower than the gain for the $LP_{01}$ mode by as much as 5 dB when the erbium dopant is located within the high-index core region, i.e., $a_2=a_1$.

Gain-Equalized Few-Mode Fiber Amplifier

An aspect of the invention is directed to a few-mode rare-earth-doped amplifier fiber that, in conjunction with a suitable pump source, equalizes gain for all of the modes supported by the core.

Figure 4:
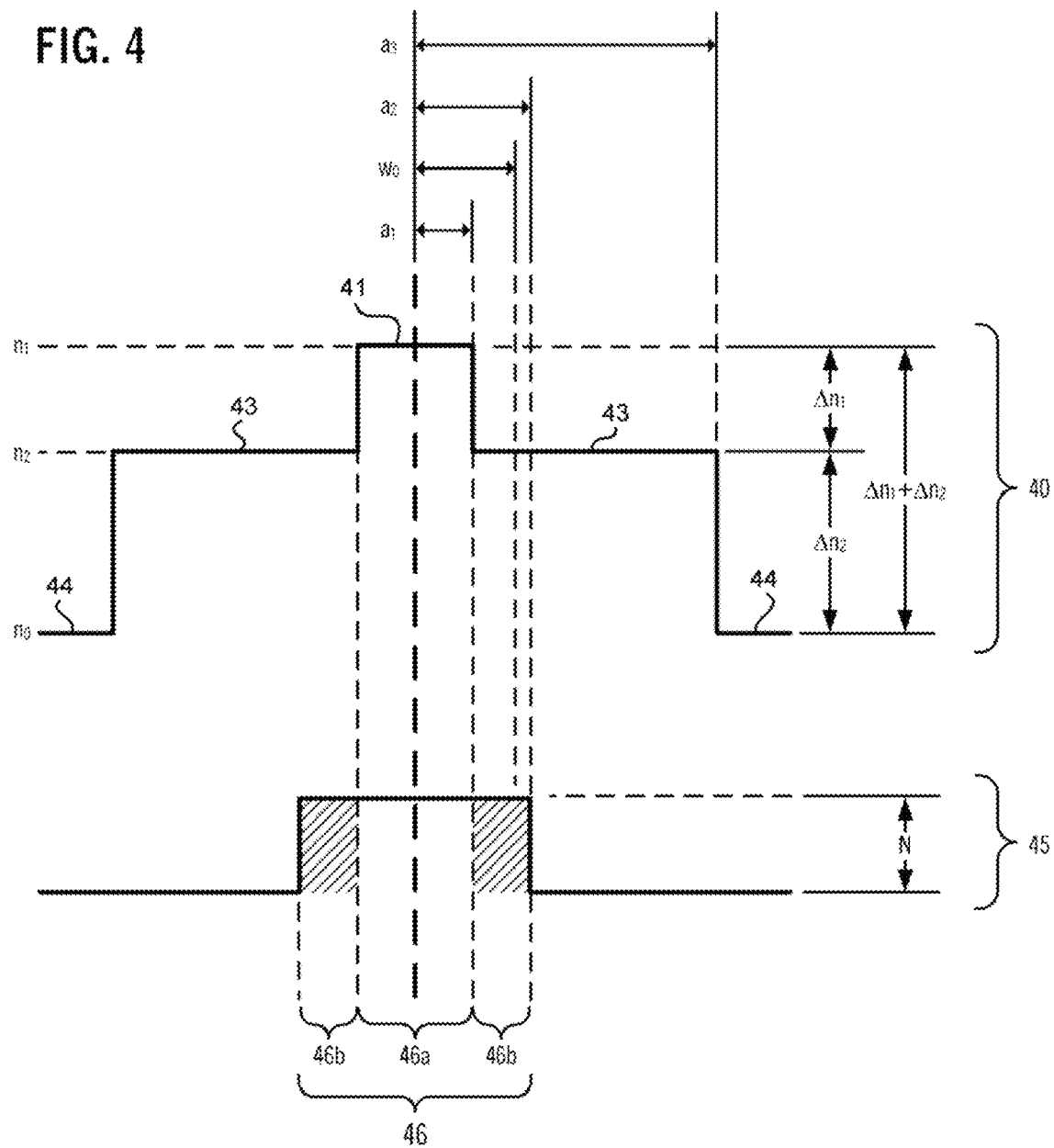
FIG. 4 shows the refractive index profile and rare-earth dopant distribution for the few-mode amplifier fiber shown in FIG. 3.

FIG. 3 shows a cross section diagram (not drawn to scale) of a fiber 30 according to a practice of the invention. FIG. 4 shows the fiber's refractive index profile 40 and rare-earth dopant distribution 45. Both the refractive index profile 40 and the dopant distribution 45 comprise a series of steps that define the following concentric fiber regions:

(1) A raised-index core 31, corresponding to central spike 41 in index profile 40, having a radius $a_1$ and a refractive index $n_1$.

(2) A rare-earth-doped active region 32 extending between r=0 and r=$a_2$ (where $a_2 > a_1$), corresponding to center step 46 in dopant profile 45, and having a rare-earth-dopant concentration of N.

(3) A raised-index inner cladding 33, corresponding to pedestal 43 in index profile 40, having a radius $a_3$ and a refractive index $n_2$.

(4) An undoped outer cladding 34, corresponding to the flat outer portion 44 in index profile 40, having a radius $a_4$ and a refractive index $n_0$.

As discussed below, the fiber regions are created by adding suitable chemical dopants to a substrate fabricated from silica or other suitable material.

For the purposes of the present discussion, the respective refractive index of each of the fiber regions is discussed with respect to its nominal refractive index: core 31 has an index difference $\Delta n_1$, relative to the refractive index $n_2$ of inner cladding 33 (i.e., $\Delta n_1 = n_1 - n_2$); inner cladding 33 has an index difference $\Delta n_2$, relative to the index $n_0$ of outer cladding 34 (i.e., $\Delta n_2 = n_2 - n_0$); and outer cladding 34 an index difference $\Delta n_0 = n_0 - n_0 = 0$. (The index difference of the core 31 relative to the outer cladding 34 is equal to the core refractive index $n_1$ minus the refractive index of the outer cladding $n_0$ or, alternatively, the sum of $\Delta n_1$ and $\Delta n_2$. In other words, $n_1 - n_2 = \Delta n + \Delta n_2$.)

Fiber 30 is configured to provide an inner waveguide and an outer waveguide. The inner waveguide is formed by the boundary between the core 31 and inner cladding 33, and is configured to support the transmission of signal light at a selected wavelength in the fundamental mode $LP_{01}$ and the higher-order $LP_{11}$, $LP_{21}$, and $LP_{02}$ modes. The outer waveguide is formed by the boundary between the inner cladding 33 and the outer cladding 34, and is configured to guide a multimode pump light that is used to amplify signal light transmitted by the inner waveguide.

FIG. 4 further shows an exemplary maximum optical field radius $w_0$ for the four supported modes. Generally speaking, optical mode-field radius is defined as a radius where the field intensity for a given mode drops to a predefined fraction of the peak field intensity. (For the fundamental $LP_{01}$ mode, which has a Gaussian shape, the predefined fraction is typically $1/e$.) Since the optical field profiles are different for different modes, the mode-field radius $w_0$ is also different for different modes. Generally, the mode-field radius $w_0$ is larger for modes with a larger mode number.

As shown in FIG. 4, the exemplary optical field radius $w_0$ is greater than the core radius $a_1$. Active region 32 has a radius $a_2$ that is equal to, or greater than, the optical field radius $w_0$, and the inner cladding has an outer radius $a_3$ that is equal to, or greater than, the radius $a_2$ of the rare-earth-doped active region 32. The pump guiding region is highly multi-moded so that pump distribution can be considered uniform throughout the pump region, including the region doped with rare-earth ions.

As further shown in FIG. 4, the rare-earth doped region 32 (corresponding to center step 46 in dopant distribution 45) has an inner portion 46a that encompasses the entire core region 31 and an outer portion 46b (shaded portion of dopant distribution 45) that surrounds the core 31 and extends into the inner cladding 33. It will be seen that the inner portion of the rare-earth doped region 46a has a refractive index equal to that of the core and that the outer portion of the rare-earth doped region 46b has a refractive index equal to that of the inner cladding.

As discussed below, one way to achieve the above-described configuration is to dope the core 31, which is co-extensive with the rare-earth doped inner region 46a, with an index-raising rare-earth dopant, and to co-dope the outer portion of the rare-earth-doped region 46b with the same rare-earth dopant and an index-lowering dopant, such as fluorine (F). Thus, fiber 30 has an active region 32 that is large enough to encompass the optical field of the supported modes, while maintaining the core radius 31 that is necessary to support the selected transmission modes.

Pump Light

Fiber 30 is configured to provide a highly multimoded outer waveguide for guiding a multimode pump light.

When the intensity of pump field launched into the outer waveguide is sufficiently high, a uniform population inversion can be established entirely over the rare-earth-doped region. For small-signals propagating with $LP_{m,n}$ mode, the gain per unit length that can be expressed as:

$$\frac{dP_{m,n}}{dz}(z) = \int_0^{a2} \int_0^{2\pi} (\sigma_s^e N_2 - \sigma_s^a N_1) p_{m,n}(r, \varphi) r d\varphi dr \qquad \text{Eq. (3)}$$

where, $p_{m,n}(r, \phi)$ is the optical intensity distribution of the $LP_{m,n}$ mode of the signal, such that:

$$P_{m,n} = \int_0^{a2} \int_0^{2\pi} p_{m,n}(r, \varphi) r d\varphi dr \qquad \text{Eq. (4)}$$

$P_{m,n}$ is the power of the $LP_{m,n}$ mode.

For a uniform population inversion maintained across the entirety of rare earth doped region, the bracketed term in Eq. (3) becomes independent of the radius, such that the equation can be expressed as:

$$\frac{dP_{m,n}}{dz}(z) = \left(\sigma_{signal}^{emission} N_2 - \sigma_{signal}^{absorption} N_1\right) P_{m,n} \qquad \text{Eq. (5)}$$

Equation (4), therefore, indicates that small-signal gain becomes independent of mode type $LP_{m,n}$.

Exemplary Practice

FIG. 5 shows a table 50 setting forth specific values for the above-described EDF design parameters in an exemplary implementation.

As set forth in table 50, the exemplary fiber has a core radius of 8 μm ($a_1 = 8$ μm), a nominal refractive index difference of 0.0081 (NA=0.154) relative to the inner cladding, and a nominal refractive index difference of 0.0181 (NA=0.230) relative to the outer cladding. For a signal in the 1550 nm region, the V-number ($2\pi a \cdot NA/\lambda$) is equal to 5.0, which supports four modes: the fundamental $LP_{01}$ mode and the higher-order $LP_{11}$, $LP_{21}$, and $LP_{02}$ modes. The rare-earth-doped region has a radius of 16 μm (i.e., $a_2 = 16$ μm), and encompasses the entire core. The region guiding the pump has a nominal index difference of 0.01 (NA=0.171) and has a radius that is 16 μm or more (i.e., $a_2 \leq a_3$).

In a special case, the fiber is configured to have a pump region with the same size as the doped region, i.e., $a_2 = a_3$. For a 980 nm pump, the V-number is 17.5 and the number of modes supported by the pump-guiding region is 153. Pump radiation with such a large number of modes can make the field distribution essentially uniform. For a pump-guiding region having a larger diameter, the mode number will vary in proportion to the square of the radius $a_3$.

Numerical Simulation

Numerical simulation techniques can be used to model the performance of fiber 30 using the values setting forth in table 50. The gain and noise figure are calculated numerically from the radial and azimuthal distribution of the upper and lower state population, $N_2$ and $N_1$, which are shown in the following:

$$N_2(r, \varphi) = \quad \text{Eq. (3)}$$

$$\frac{\frac{\tau \sigma_s^a}{h\nu_s} \cdot I_s(r, \varphi) + \sum_j \frac{\tau \sigma_{\nu_j}^a}{h\nu_j} \cdot I_{ASE(\nu j)}(r, \varphi) + \frac{\tau \sigma_p^a}{h\nu_p} \cdot I_p}{\frac{\tau(\sigma_s^a + \sigma_s^e)}{h\nu_s} \cdot I_s(r, \varphi) + \sum_j \frac{\tau(\sigma_{\nu_j}^a + \sigma_{\nu_j}^e)}{h\nu_j} \cdot I_{ASE,(\nu j)}(r, \phi) + \frac{\tau(\sigma_p^a + \sigma_p^e)}{h\nu_p} \cdot I_p + 1} \cdot N_0$$

The fiber is assumed to have uniform erbium doping with a concentration of $(6.89 \times 10^{24})/m^3$.

Figure 6A:
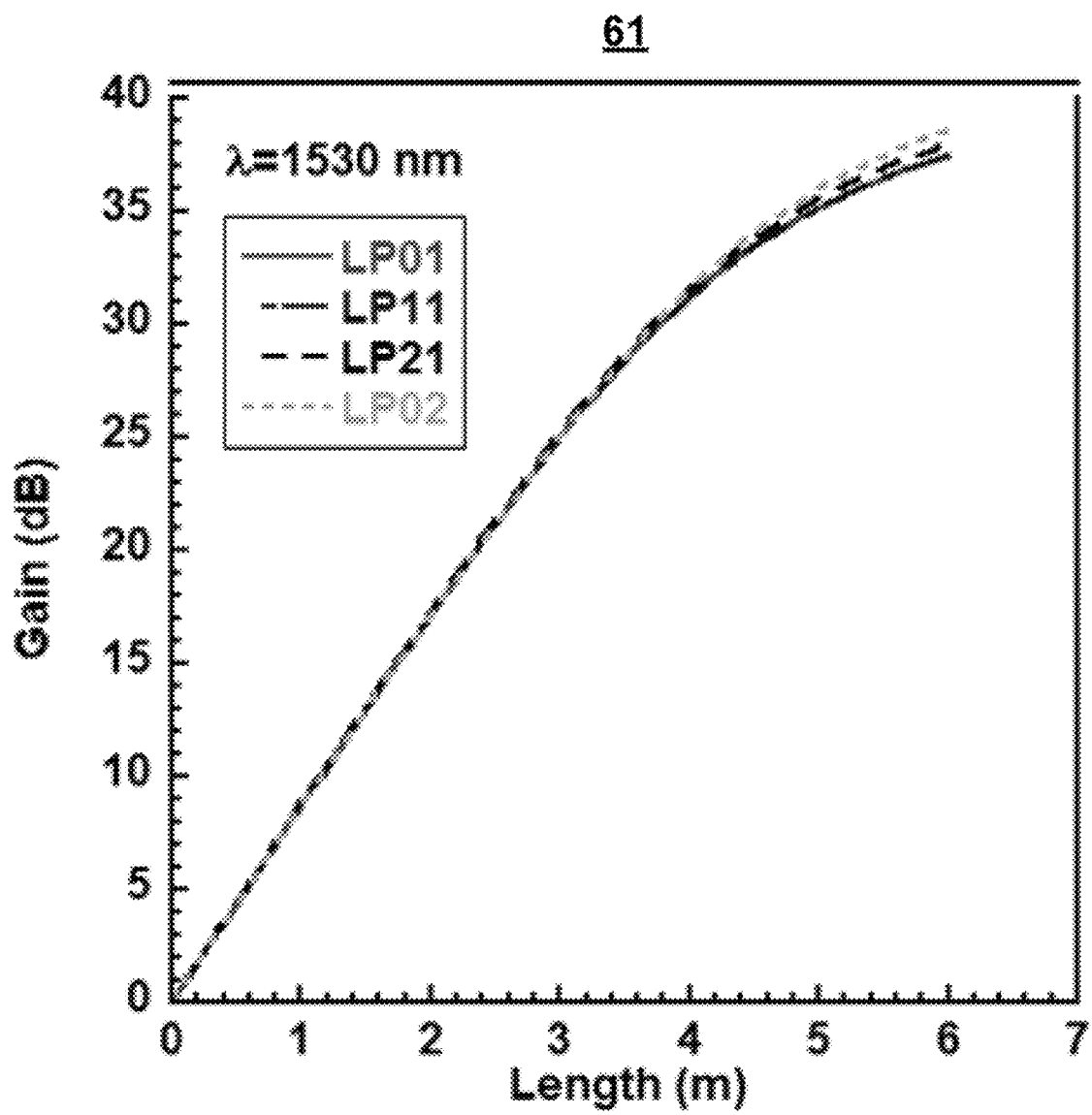
Figure 6B:
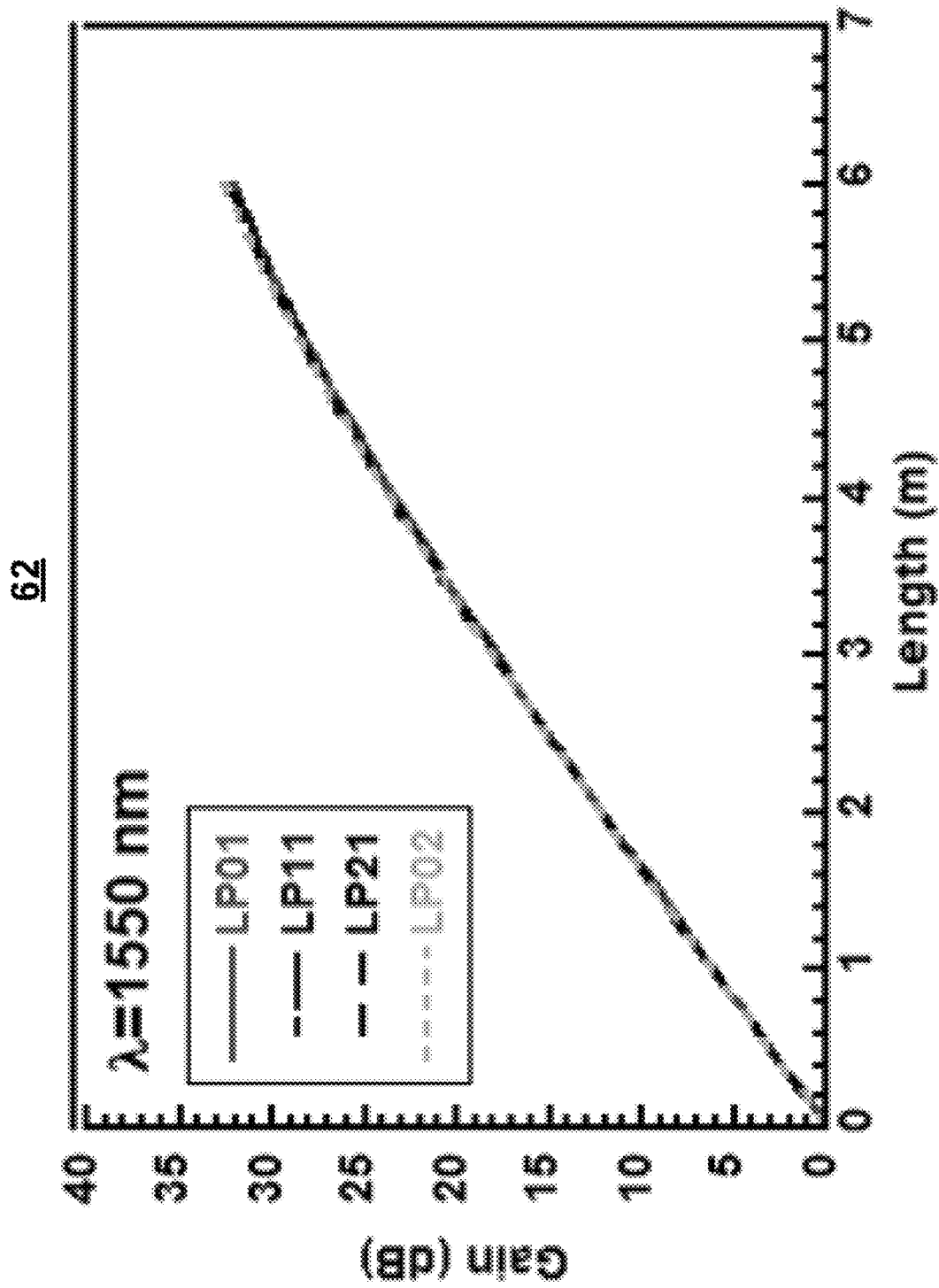
Figure 6C:
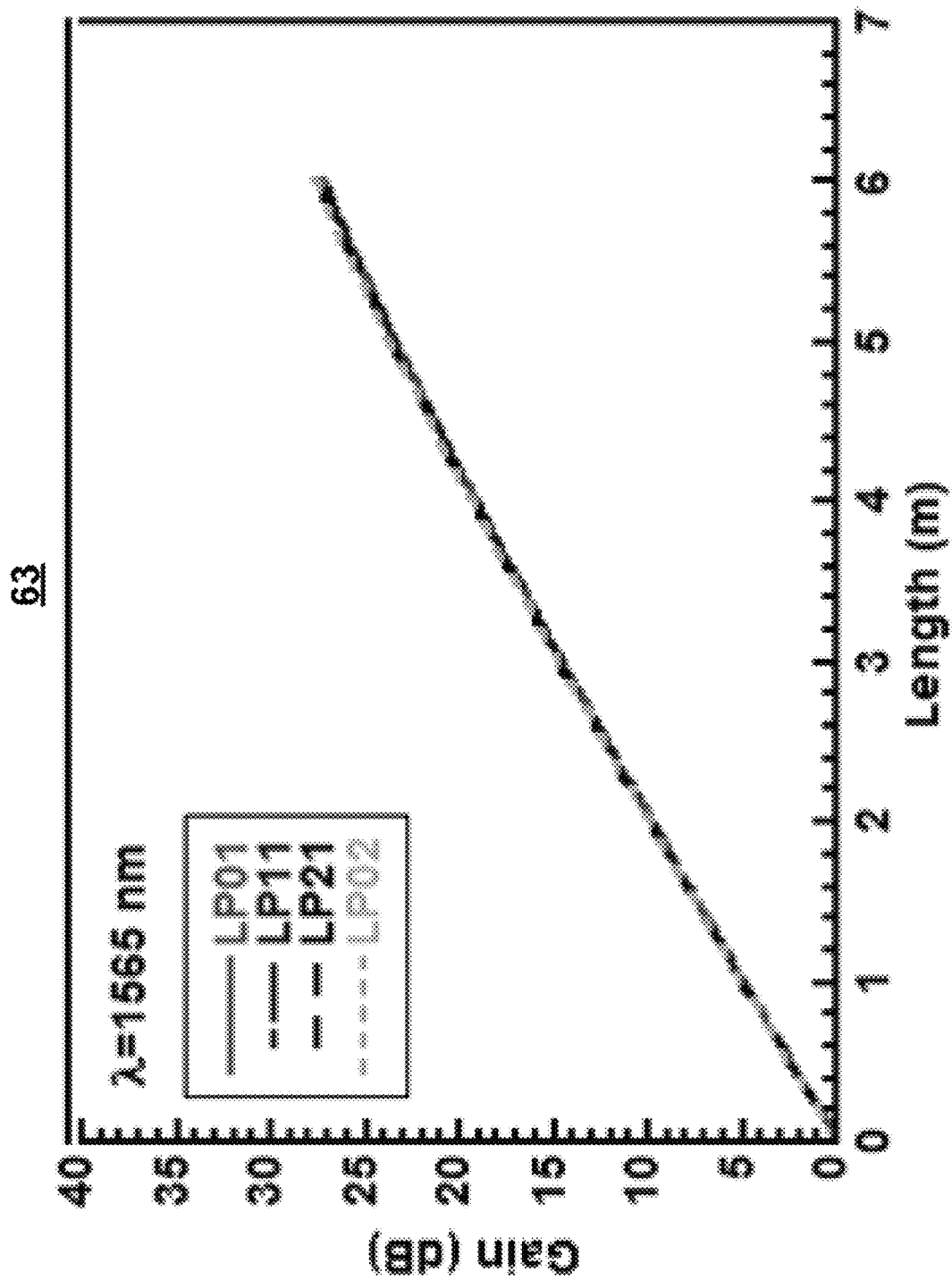

FIGS. 6A-6C show a series of three graphs 61, 62, 63 illustrating the calculated gain for four different modes $LP_{01}$, $LP_{11}$, $LP_{21}$, and $LP_{02}$ as a function of fiber length, at three signal wavelengths within the C-band: 1530 nm (FIG. 6A, graph 61), 1550 nm (FIG. 6B, graph 62), and 1565 nm (FIG. 6C, graph 63). The input signal power is assumed to be −20 dBm, and the pump power level is assumed to be 1.24 mW/μm², which corresponds to 1 W for an inner cladding diameter ($2 \cdot a_3$) of 32 μm. Graphs 61-63 illustrate the small the differences between the respective curves for the four supported modes at the three signal wavelengths.

Figure 7C:
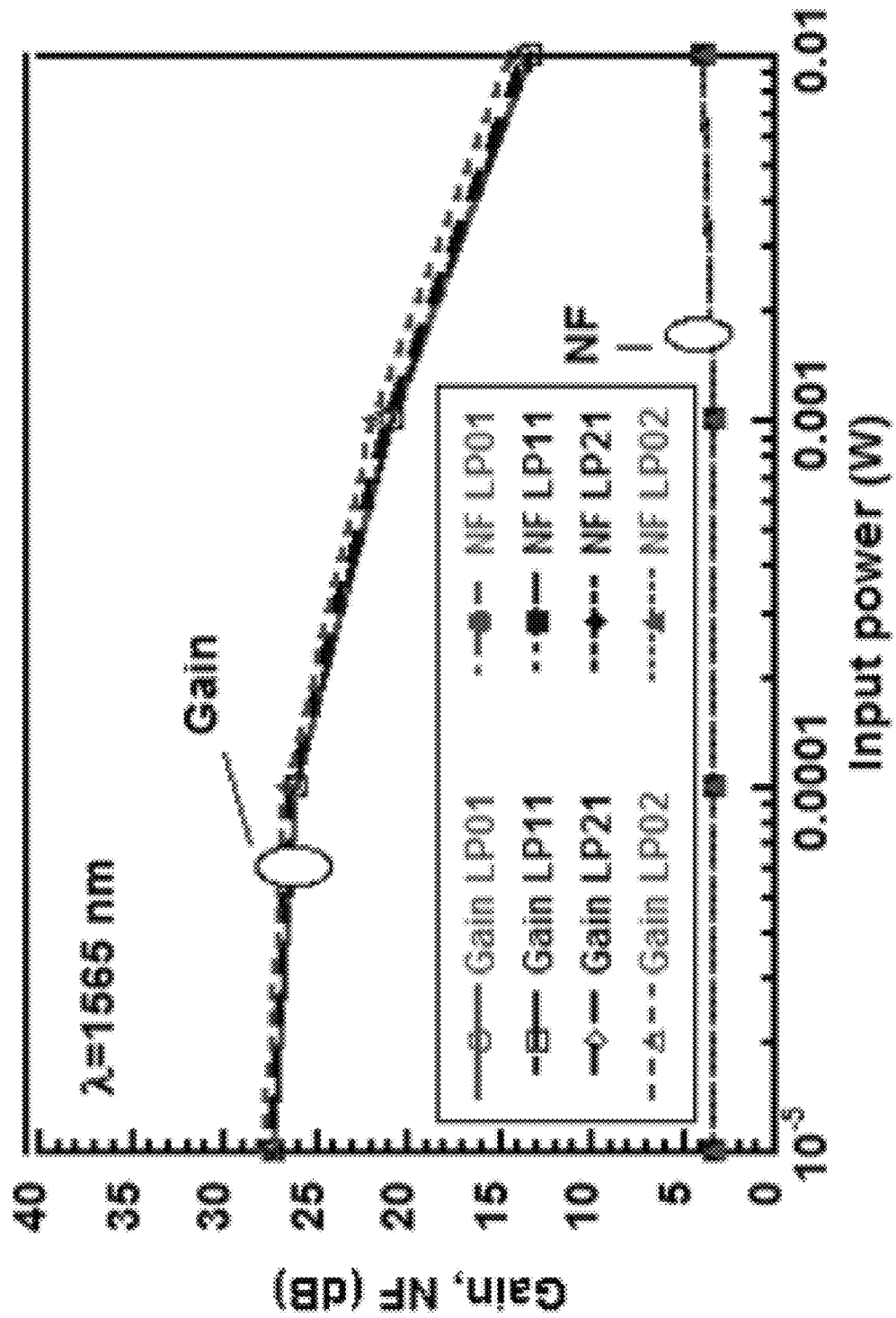

FIGS. 7A-7C show a series of three graphs 71, 72, 73 showing the calculated values for gain and noise figure (NF) as a function of input signal power for the $LP_{01}$, $LP_{11}$, $LP_{21}$ and $LP_{02}$ modes at wavelengths of 1530 nm (FIG. 7A, graph 71), 1550 nm (FIG. 7B, graph 72), and 1565 nm (FIG. 7C, graph 73). The length of the gain fiber is assumed to be 6 meters, and intensity of the 980 nm pump input is assumed to be 1.24 mW/μm², which corresponds to 1 W for a 32-μm inner cladding. As shown in graphs 71-73, the modal gain difference is found to be less than 2 dB for a wide range of input signal powers. The calculated NF is about 4 dB for input signal power of 1 mW.

Figure 8A:
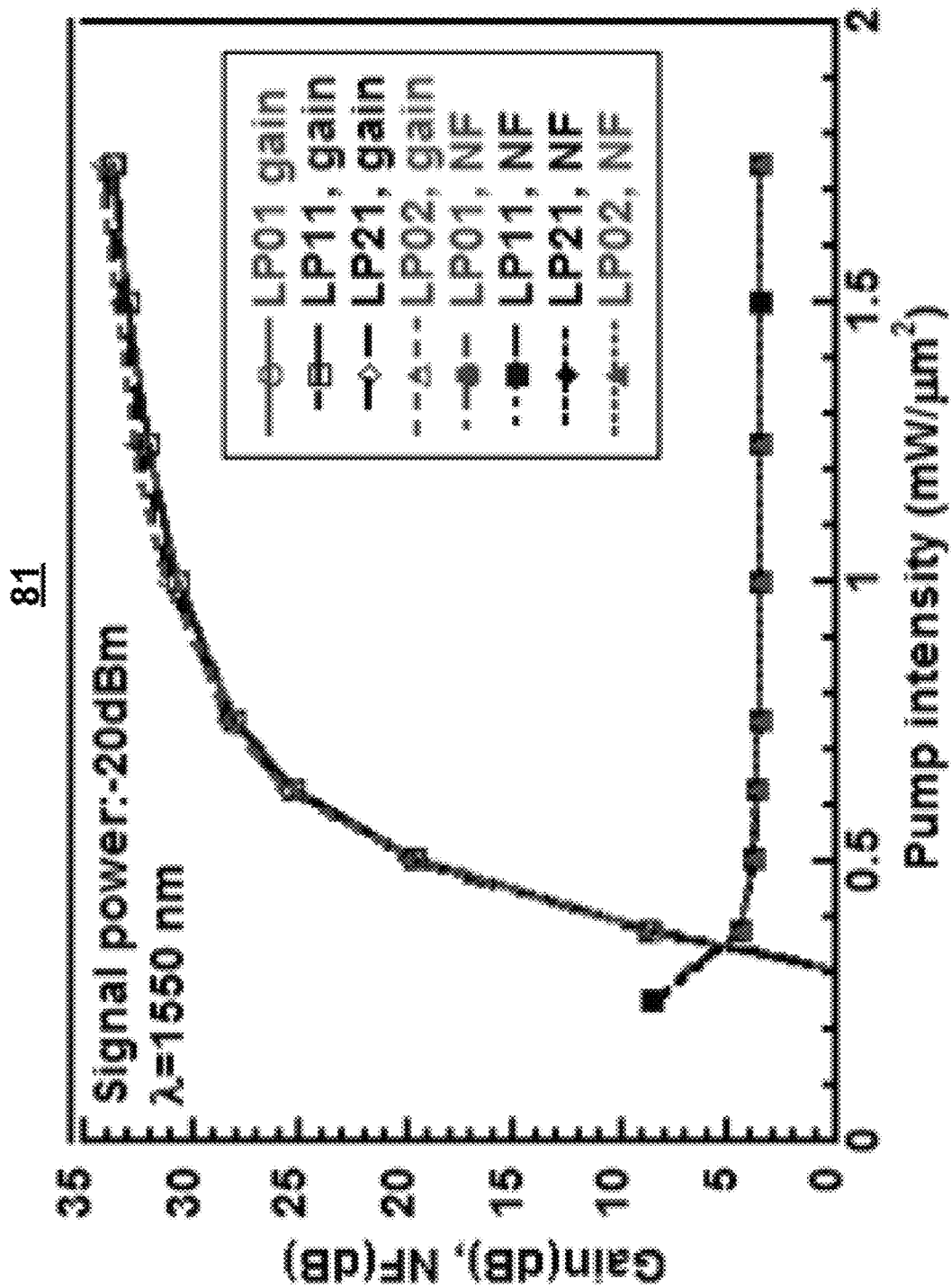
Figure 8B:
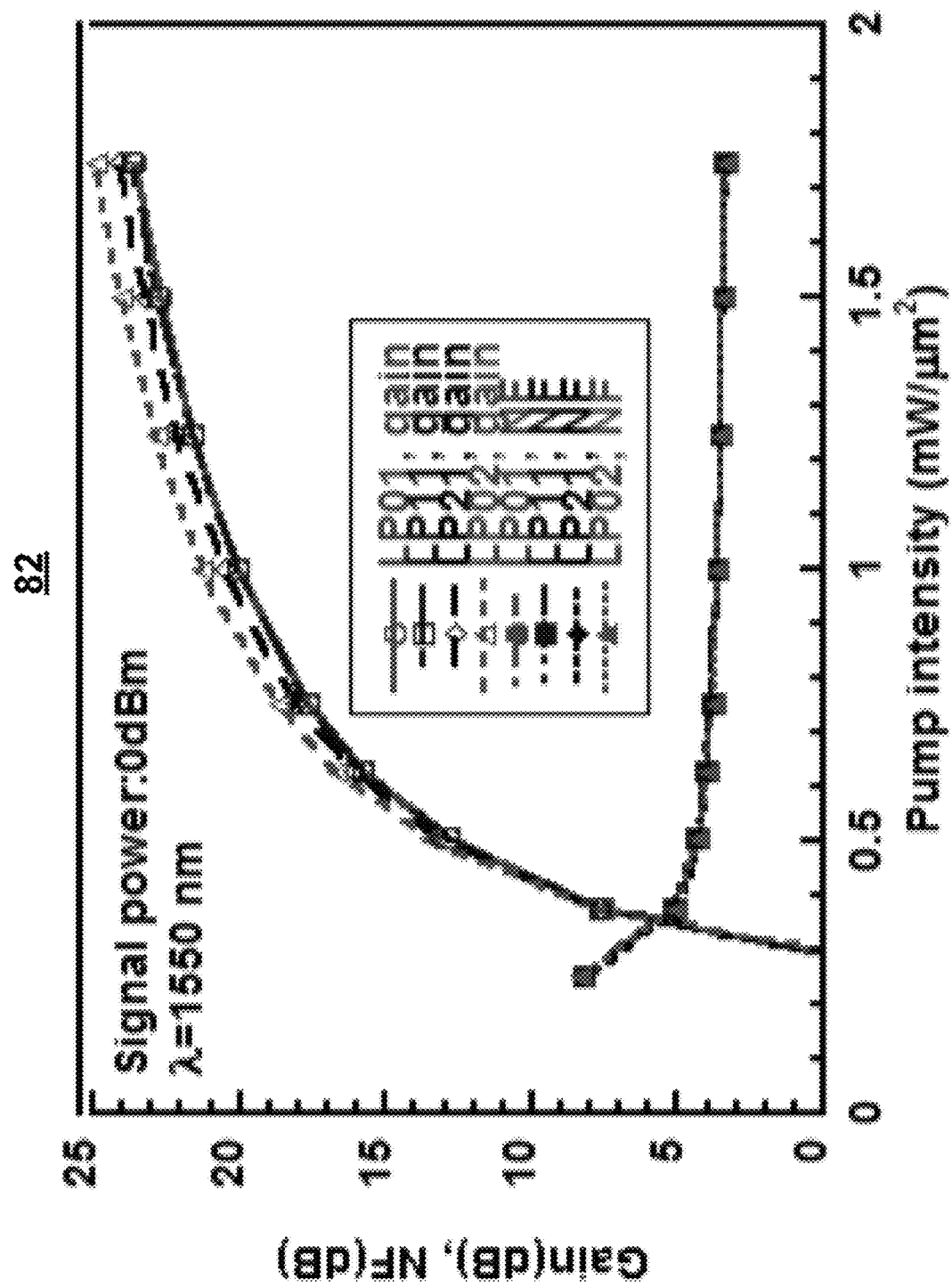

FIGS. 8A and 8B show a pair of graphs 81, 82 illustrating calculated gain and NF for the four supported modes as a function of launched pump power, with the signal power held constant at −20 dBm (FIG. 8A, graph 81) and 0 dBm in (FIG. 8B, graph 82). The length of gain fiber is again assumed to be 6 meters. For weak input signals the gain observed by different modes are almost the same. For stronger input signals, however, the differential gain increases to about 2 dB as the pump intensity is raised to 1.5 mW/μm².

Figure 9:
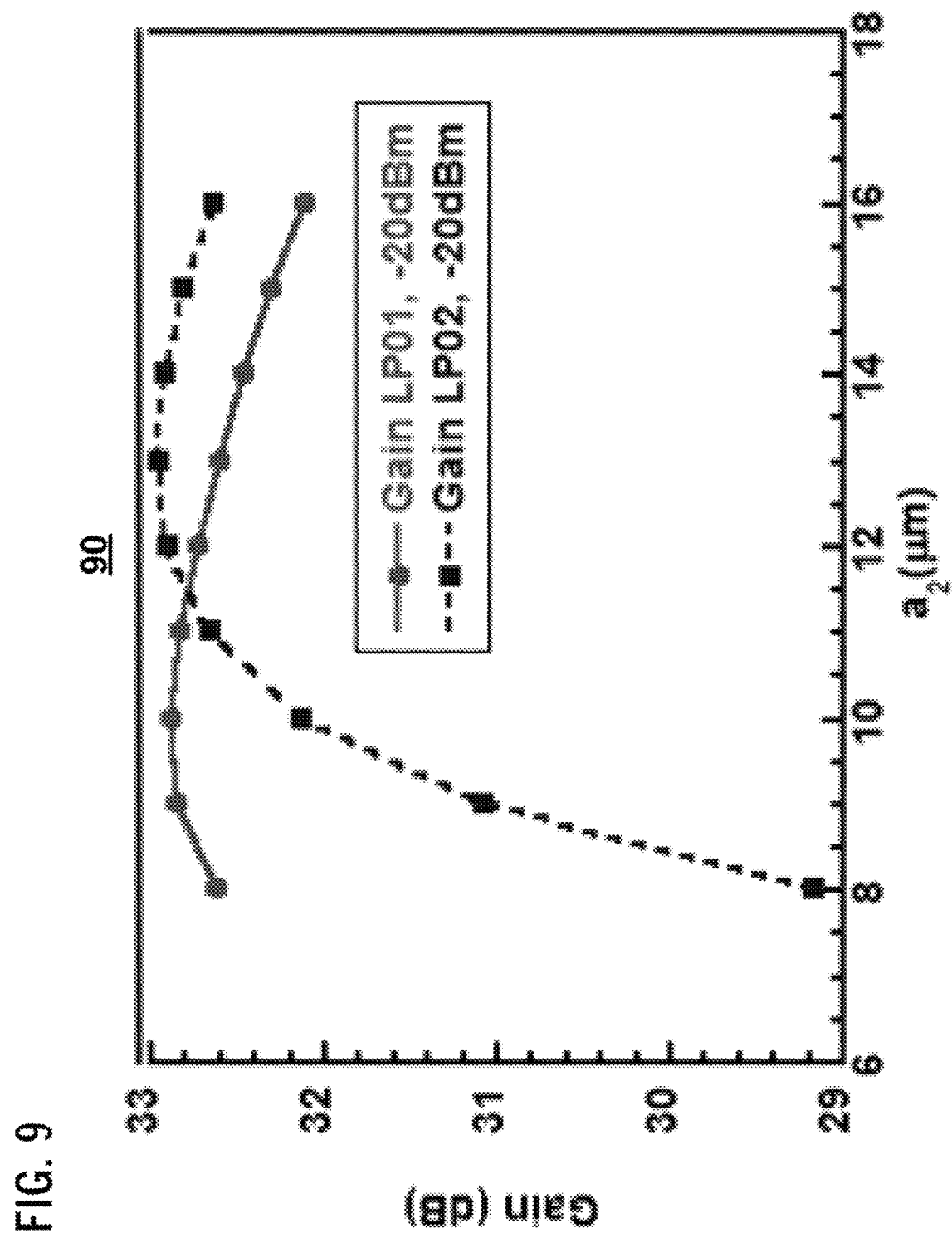

FIG. 9 shows a graph 90 illustrating calculated gain for the $LP_{01}$ and $LP_{02}$ modes as a function of the radius of rare-earth-doped region $a_2$. The core radius is assumed to be 8 μm (V=5.0). The input signal power is assumed to be −20 dBm, and the pump intensity is assumed to be 1.24 mW/μm².

The gain for $LP_{01}$ and $LP_{02}$ signal modes have also been calculated for an erbium-doped region with different radii, varying within the range of 8 μm to 16 μm, under the assumption of uniform pump intensity distribution. When the core rare earth doped region has a radius of 8 μm, i.e., the same as the core, the differential in gain is around 3 dB, and decreases with an increase in the size of the rare-earth-doped region. The differential gain can be kept below 1 dB when radius of rare-earth-doped region is increased to 10 μm 16 μm, i.e., 25% to 100% larger than the core size. Gain of the two modes become equal when the active region radius $a_2$ is approximately 11.5 μm.

Moreover, it should be recognized while a uniform doping distribution is desirable, some variations from nominal uniform distribution may exist. These variations may arise, for example, as a result of fabrication difficulties and may also depend upon the particular processes by which the fiber preforms are fabricated.

In the above analyses, the erbium dopant concentration is assumed to be uniform within the erbium-doped region, $a_2$. It is possible to reduce the width of rare-earth doped region by matching the rare-earth dopant distribution with the sum of optical power distributions $p_{m,n}$ in different lower-order modes. For example, one can tailor the rare-earth dopant distribution proportional to the following:

$$N(r) = \sum_{m,n} \int_0^{2\pi} p_{m,n}(r, \varphi) d\varphi$$

Matching the doping profile with power distribution can minimize population inversion in regions where is no signal, and thereby suppress spontaneous emission noise.

Star-Shaped Outer Waveguide

Figure 10:
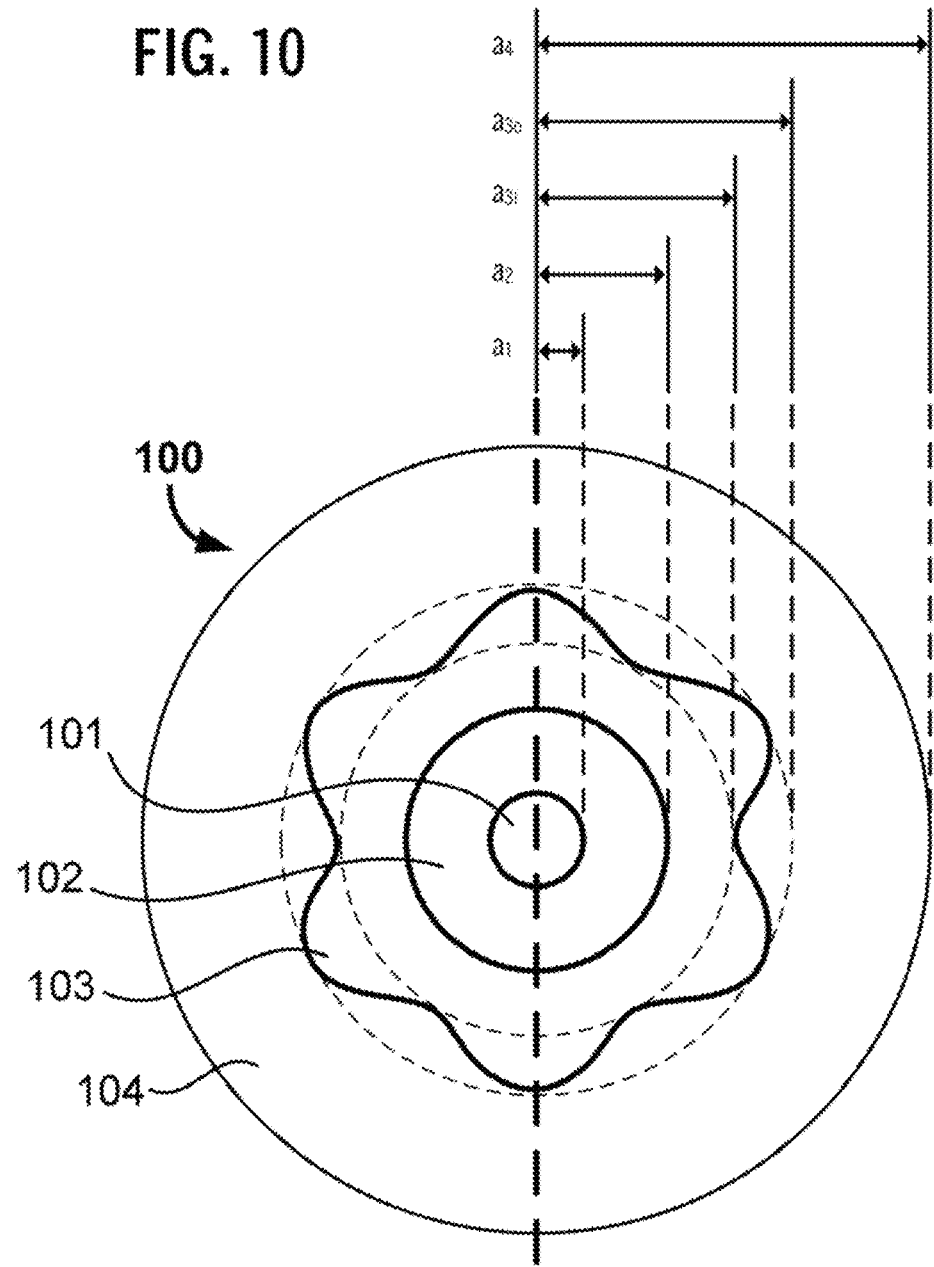
FIG. 10 shows a cross-section schematic of a few-moded fiber amplifier incorporating a star-shaped outer waveguide according a further aspect of the invention.

FIG. 10 shows a cross-section diagram of a gain-equalized few-mode fiber 100 according to a further aspect of the invention, comprising a core 101 with a radius of a1, a rare-earth-doped active region 102 with a radius of a2, an inner cladding 103 with a radius that varies between a minimum radius a3i and an outer radius a3o, and an outer cladding 104 with radius a4.

As in fiber 30, discussed above, the boundary between the inner cladding 103 and the outer cladding 104 provides an outer waveguide for guiding pump radiation. In fiber 100, this boundary is corrugated or star-shaped. The depicted configuration facilitates mode-mixing and in maintaining a uniform pump intensity distribution.

Multicore Fiber

According to a further aspect of the invention, the above-described techniques are applied in the context of a multicore fiber.

Figure 11:
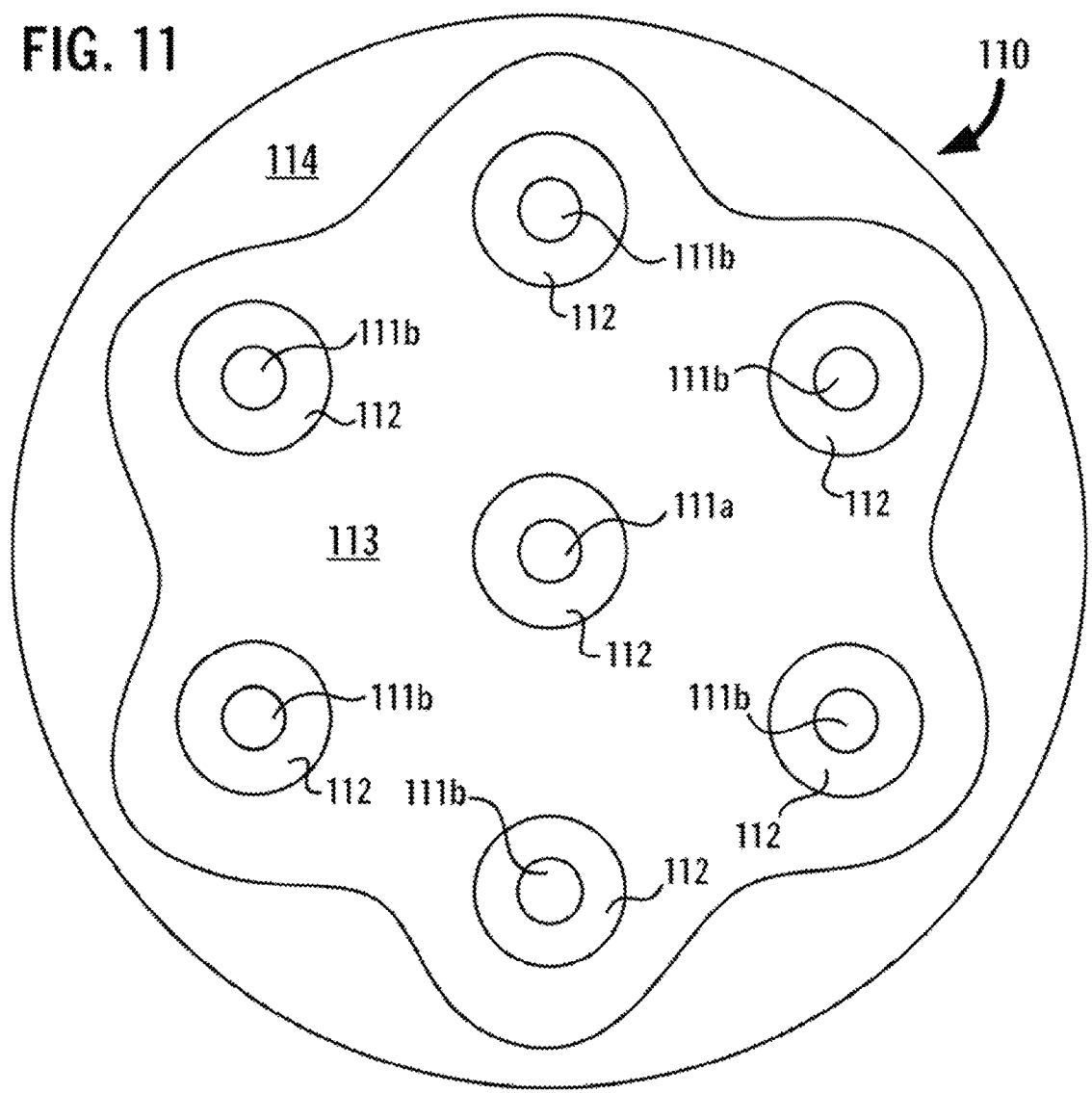
FIG. 11 shows a cross-section schematic of a few-moded fiber amplifier having seven cores, in accordance with a further aspect of the invention.

FIG. 11 shows a cross-section schematic of a few-moded multicore fiber (MCF) 110 according to this aspect of the invention.

MCF 110 comprises a central few-mode core 111a and six outer few-mode cores 111b arranged in a regular hexagonal array around the central core 111a. Each individual core 111a, 111b is provided with a respective rare-earth-doped region 112 having a radius that is sufficiently large to encompass the optical field of all of the modes supported by each core. In the depicted example, all seven cores 111a, 111b and their respective active regions 112 are enclosed by a common star-shaped inner cladding 113. The boundary between the inner cladding and the outer cladding 114 provides a pump light waveguide that is shared by all seven cores 111a, 111b.

Fabrication Techniques

In an exemplary practice, a few-mode rare-earth-doped fiber in accordance the invention is fabricated using a modified chemical vapor deposition (MCVD) technique. An aerosol or other vapor phase deposition technique is used to deposit layers of chemical soot onto the interior wall of a silica tube that is subsequently sintered and collapsed to form a cylindrical preform. The preform is then loaded into a draw tower and drawn into fiber.

In one practice of the invention, the core region has the following respective index difference values Δn for the core and inner cladding relative to the outer cladding:

| | | |
|---|---|---|
| core relative to inner cladding | $\Delta n_1 = 0.0081$ | NA = 0.154 |
| inner cladding relative to outer cladding | $\Delta n_2 = 0.0100$ | NA = 0.171 |
| core relative to outer cladding | $\Delta n_1 + \Delta n_2 = 0.0181$ | NA = 0.230 |

(These values are also set forth in table 50, shown in FIG. 5.) The core region can be doped, for example, with erbium and co-doped with aluminum (Al) in order to prevent concentration quenching. Fluorine dopant, boron dopant, or a combination of fluorine and boron dopants, may be added in order to allow a higher concentration of aluminum dopant in the fiber's pedestal region.

General Technique

Figure 12:
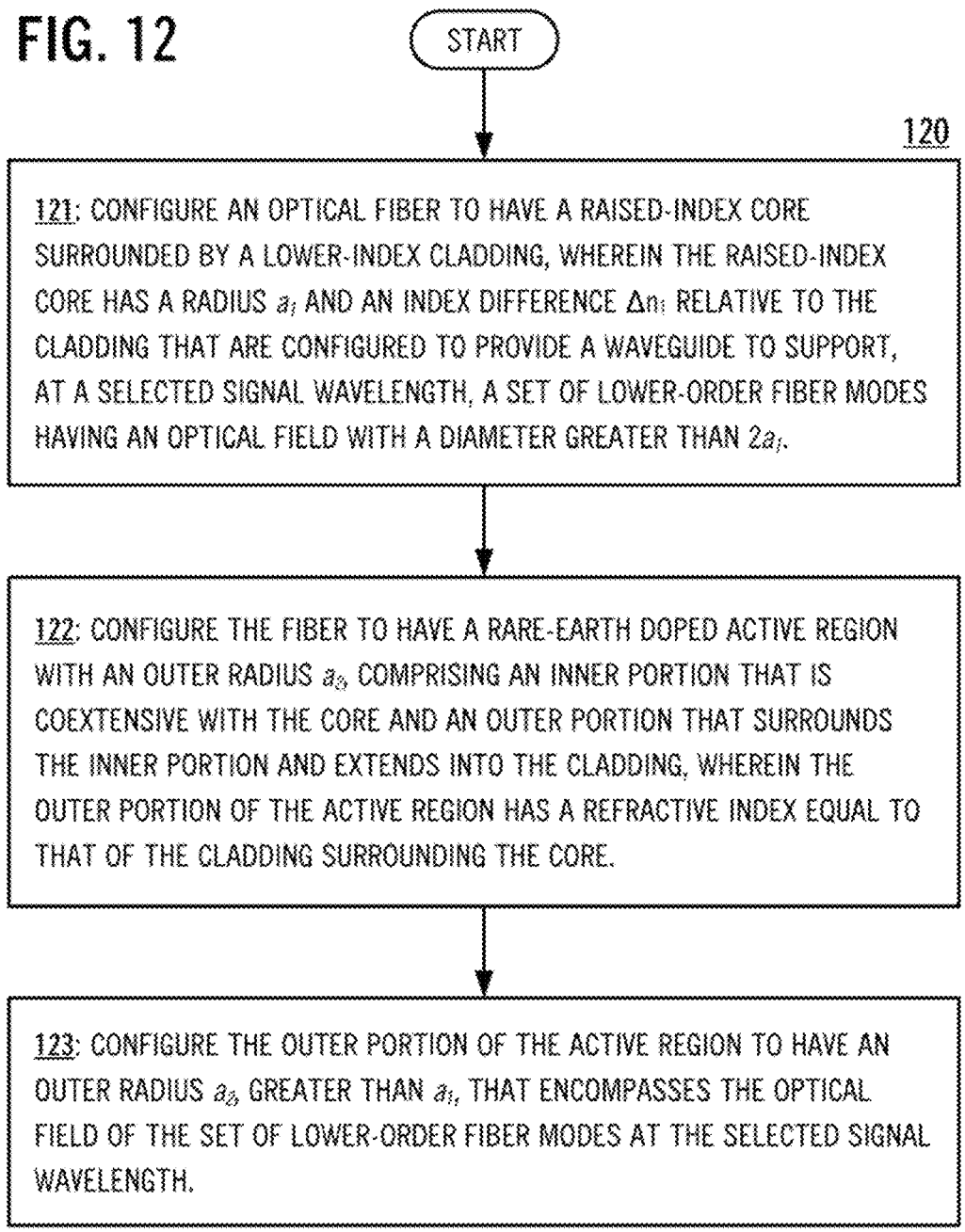
FIG. 12 shows a flowchart of a general method according to the above-described aspects of the invention.

FIG. 12 shows a flowchart of a general method 120 according to the above-described aspects of the invention. Method 120 comprises the following steps:

121: Configure an optical fiber to have a raised-index core surrounded by a lower index cladding, wherein the raised-index core has a radius $a_1$ and an index difference $\Delta n1$ relative to the cladding that are configured to provide a waveguide to support, at a selected signal wavelength, a set of lower-order fiber modes having an optical field with a diameter greater than $2 \cdot a_1$.

122: Configure the fiber to have a rare-earth doped active region with an outer radius $a_2$, comprising an inner portion that is coextensive with the core and an outer portion that surrounds the inner portion and extends into the cladding, wherein the outer portion of the active region has a refractive index equal to that of the cladding surrounding the core.

123: Configure the outer portion of the active region to have an outer radius $a_2$, greater than $a_1$, that encompasses the optical field of the set of lower-order fiber modes at the selected signal wavelength.

As discussed above, according to an aspect of the invention, the fiber may be configured to have a cladding that includes an inner cladding surrounding the core and an outer cladding surrounding the inner cladding, wherein the inner cladding and the outer cladding are configured to have an index difference $\Delta n_2$ therebetween so as to provide a pump waveguide that supports a multimode pump light, and wherein the inner cladding has an outer radius a3, greater than or equal to the radius of the active region $a_2$.

According to further aspects of the invention discussed above, the fiber may be configured to have a star-shaped outer waveguide, or to have a plurality of few-moded signal cores.

CONCLUSION

While the foregoing description includes details that will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. An optical fiber, comprising:
   a fiber body having a raised-index core surrounded by a lower-index cladding region, wherein the raised-index core has a radius $a_1$ and an index difference $\Delta n_1$ relative to the surrounding cladding region that are configured to provide a signal waveguide that supports, at a selected signal wavelength, a set of lower-order fiber modes having an optical field with a diameter greater than $2 \cdot a_1$;
   wherein the fiber body further includes a rare-earth doped active region having an inner portion that is coextensive with the core and an outer portion that extends into the cladding, wherein the inner portion of the active region has a refractive index equal to that of the core and wherein the outer portion of the active region has a refractive index equal to that of the cladding; and
   wherein the a rare-earth doped active region has an outer radius $a_2$, greater than $a_1$, that encompasses the optical field of the set of lower-order fiber modes at the selected signal wavelength,
   so as to equalize gain for the set of lower-order fiber modes.

2. The optical fiber of claim 1, wherein the set of lower-order fiber modes comprises at least one of the $LP_{01}$, $LP_{11}$, $LP_{21}$, and $LP_{02}$ modes.

3. The optical fiber of claim 1,
   wherein the active region outer radius $a_2$ exceeds the core radius $a_1$ by a percentage ranging from 10% to 100%.

4. The optical fiber of claim 3,
   wherein the rare-earth dopant concentration is essentially uniform throughout the active region outer radius $a_2$.

5. The optical fiber of claim 3,
   wherein the rare-earth dopant concentration is non-uniform within the active region outer radius $a_2$.

6. The optical fiber of claim 5,
   wherein the rare-earth dopant concentration radial profile is proportional to the sum of optical power radial distribution profiles of the different lower order modes.

7. The optical fiber of claim 3,
   wherein the core is doped with a rare-earth dopant, and
   wherein the outer portion of the active region is co-doped with the rare-earth dopant and an index-lowering dopant.

8. The optical fiber of claim 7,
   wherein the index-lowering dopant is fluorine or boron or a combination of fluorine and boron.

9. The optical fiber of claim 1,
   wherein the active region is doped with one or more dopants selected from a group consisting of erbium, ytterbium, neodymium, thulium, praseodymium, and holmium.

10. The optical fiber of claim 1,
    wherein the cladding comprises a raised-index inner cladding region having an outer radius $a_3$ and a lower-index outer cladding region, wherein the inner cladding region has an index difference $\Delta n_2$ relative to the outer cladding that is configured to provide a pump waveguide for a pump light input into the fiber,
    wherein the inner cladding region extends across the active region, and
    wherein the outer radius $a_3$ of the inner cladding region is equal to, or greater than, the outer radius $a_2$ of the active region.

11. The optical fiber of claim 10,
    wherein the core has a radius $a_1$=8 μm;
    wherein the active region has an outer radius $a_2$=16 μm;
    wherein the inner cladding region has an outer radius $a_3 \geq 16$ μm;
    wherein the refractive index difference $\Delta n_1$ between the core and the inner cladding is 0.0081; and
    wherein the refractive index difference $\Delta n_2$ between the inner cladding and the outer cladding is 0.0100.

12. A multicore optical fiber, comprising:
    a fiber body comprising a plurality of raised-index cores surrounded by a common lower-index cladding region, wherein each core has a respective radius and a respective index difference relative to the surrounding cladding that are configured to support a set of lower-order fiber modes, wherein the fiber body further includes a plurality of active regions corresponding to the plurality of cores, wherein each active region is doped with a rare-earth dopant, wherein each active region includes a central portion that extends across a respective core and an outer portion that extends into the cladding, and wherein each active region has an outer radius that encompasses the optical field of each respective set of lower-order fiber modes.

13. The multicore fiber of claim 12, wherein the cladding comprises a raised-index inner cladding region and a lower-index outer cladding region, wherein the inner cladding region has an index difference $\Delta n_2$ relative to the outer cladding region that is configured to provide a waveguide for a pump light input into the fiber, and wherein the inner cladding region extends across all of the plurality of active regions.

14. A method for equalizing gain in a few-mode amplifier fiber, comprising:

(a) configuring an optical fiber to have a raised-index core surrounded by a lower-index cladding region, wherein the raised-index core has a radius $a_1$ and an index difference $\Delta n_1$ relative to the surrounding cladding region that are configured to provide a waveguide to support, at a selected signal wavelength, a set of lower-order fiber modes having optical fields with diameters greater than $2 \cdot a_1$;

(b) configuring the fiber to have a rare-earth doped active region with an outer radius $a_2$, comprising an inner portion that is coextensive with the core and an outer portion that surrounds the inner portion and extends into the cladding, wherein the outer portion of the active region has a refractive index equal to that of the cladding surrounding the core; and (c) configuring the outer portion of the active region to have an outer radius $a_2$, greater than $a_1$, that encompasses the optical field of the set of lower-order fiber modes at the selected signal wavelength.

15. The method of claim 14, wherein step (a) comprises configuring the fiber to have a cladding that includes an inner cladding surrounding the core and an outer cladding surrounding the inner cladding, wherein the inner cladding and the outer cladding are configured to have an index difference $\Delta n_2$ therebetween so as to provide a pump waveguide that supports a multimode pump light, and wherein the inner cladding has an outer radius $a_3$, greater than or equal to the radius of the active region $a_2$.

* * * * *